(No Model.)

A. K. MANSFIELD.
SOLID END CONNECTING ROD.

No. 453,015. Patented May 26, 1891.

Witnesses:
J. W. Snyder
Edge T. Cope.

Inventor
Albert K. Mansfield

UNITED STATES PATENT OFFICE.

ALBERT K. MANSFIELD, OF SALEM, OHIO.

SOLID END CONNECTING-ROD.

SPECIFICATION forming part of Letters Patent No. 453,015, dated May 26, 1891.

Application filed September 22, 1890. Serial No. 365,841. (No model.)

*To all whom it may concern:*

Be it known that I, ALBERT K. MANSFIELD, a citizen of the United States, residing at Salem, in the county of Columbiana and State of Ohio, have invented a new and useful Improvement in Solid End Connecting-Rods, of which the following is a specification.

My invention relates to improvements in solid end connecting-rods, and the object of my improvement is to reduce the expense of making such rods while retaining all the necessary adjustments usually provided in the stub ends of connecting-rods. I attain this object by the means illustrated in the accompanying drawings, in which—

Figure 1:
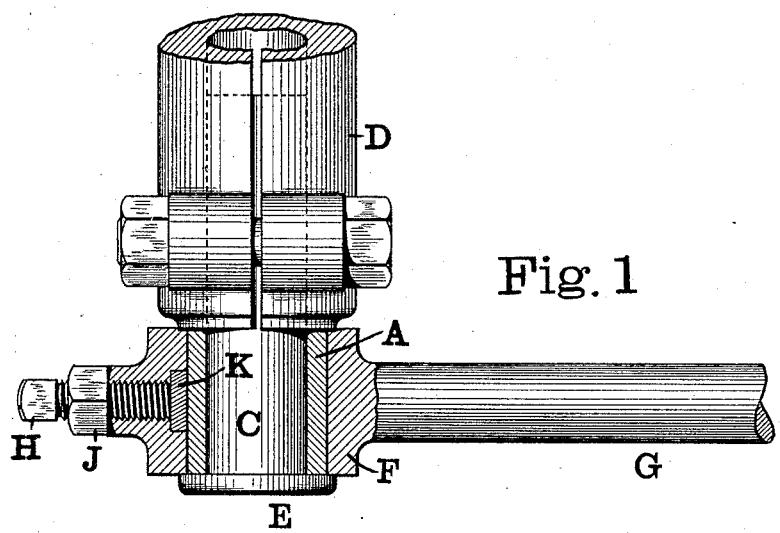
Figures 2, 3:
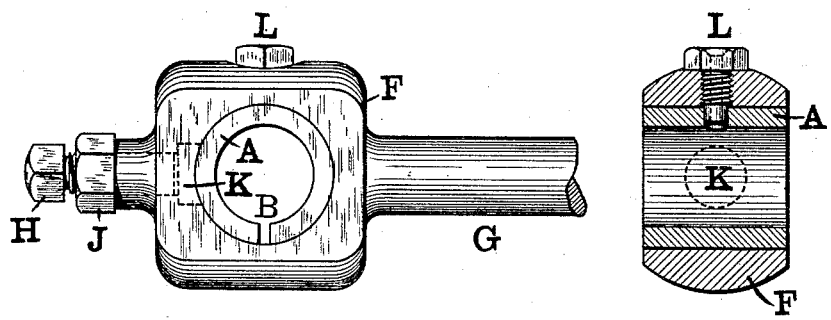

Figure 1 is a sectional plan of the stub end, showing it in position on its journal. Fig. 2 is a longitudinal elevation of a part of the rod; and Fig. 3 is a cross-section through the center of the stub end.

Similar letters refer to the same parts throughout the views.

A is a bushing, made of brass or other suitable material and split through its entire length at B.

C is the journal which the bushing receives and which is held as a rigid part of any suitable piece D. The end of the journal carries a collar E.

F is the stub end forming a part of the connecting-rod G and carrying the bushing in a round hole bored to receive it.

H is a set-screw, J a check or jam nut, and K is a round block fitted into an enlarged part of the hole bored to receive the set-screw and formed on one face to fit the periphery of the bushing A.

L is a hollow screw or stud screwed into the top of the stub end and fitting into the top of the bushing. The stud is hollow, to serve as an oil-hole for the journal. It enters a hole in the top of the bush, to hold the bush from revolving and from lateral movement. To take up wear of the bush or of its journal, which wear takes place mostly in line with the axis of the rod, the slit B allows the bush to be closed together to a small extent, which is accomplished by screwing in the set-screw against the block K, which in turn closes or flattens the bush. After wear is taken up in this way the bush fits the hole in the stub end only on the semi-circumference opposite the set-screw; but it fits one face of the block K also, which, having quite a large area, is sufficient bearing on that side of the bush for practical requirements. The open joint of a worn bush, which occurs on the side next the set-screw, is hidden by the collar E.

What I claim as my invention is—

The combination of a solid stub end F, having a round hole through its body to receive a bushing, and a counterbore to receive the block K, the bushing A, split at one point of its circumference and inserted into the round hole of the stub end F, the round block K, having one of its faces made to conform to the periphery of the bushing A and inserted in the counterbore of the stub end, the set-screw H, acting against the block K, and the journal C, substantially as and for the purpose set forth.

ALBERT K. MANSFIELD.

Witnesses:
JULIUS W. SNYDER,
EDGE T. COPE.